United States Patent [19]
Guth

[11] 3,788,347
[45] Jan. 29, 1974

[54] SINGLE HOSE COUPLING SYSTEM
[75] Inventor: Lauren W. Guth, Louisville, Ky.
[73] Assignee: General Electric Company, Louisville, Ky.
[22] Filed: July 27, 1972
[21] Appl. No.: 275,727

[52] U.S. Cl............................. 137/355.17, 137/608
[51] Int. Cl............................................. B65h 75/36
[58] Field of Search .. 137/355.17, 624.11, 608, 609

[56] References Cited
UNITED STATES PATENTS

| | | | |
|---|---|---|---|
| 3,092,134 | 6/1963 | Allen et al. | 137/355.17 |
| 3,301,022 | 1/1967 | Low | 137/624.11 X |
| 3,417,782 | 12/1968 | Mentnech | 137/624.11 |
| 3,635,243 | 1/1972 | Brezosky | 251/289 X |
| 2,640,724 | 6/1953 | Sanders et al. | 137/355.17 X |
| 3,177,898 | 4/1965 | Scott et al. | 137/624.11 |
| 3,392,747 | 7/1968 | Waldrop | 137/624.11 X |
| 3,439,706 | 4/1969 | Barrett | 251/289 X |
| 3,466,006 | 9/1969 | Livingston | 137/624.11 X |
| 3,683,964 | 8/1972 | Harrold | 137/624.11 |

*Primary Examiner*—Samuel Scott
*Attorney, Agent, or Firm*—Francis H. Boos, Jr.

[57] ABSTRACT

By the present invention there is provided a system for connecting a sequentially controlled washing machine to a faucet supplying liquid under line pressure, including a coupling attachable to the faucet and a multipassageway conduit connecting the coupling to the machine. A solenoid controlled water valve is encapsulated in the housing between the line pressure faucet inlet area and an outlet area communicating with a passageway in the conduit for introducing water at flow pressure to the washing machine only when the solenoid controlled water valve is energized. The electrical wires necessary for energizing the solenoid valve at predetermined times in the machine cycle are brought to the solenoid from the machine sequence control system through another passageway in the conduit. Effluent from the washing machine is directed through still another passageway in the conduit and discharged through an appropriate passageway in the housing.

2 Claims, 4 Drawing Figures

SINGLE HOSE COUPLING SYSTEM

BACKGROUND OF THE INVENTION

This invention relates generally to an improved fluid coupling system for a water using device or water treatment apparatus such as an automatic washing machine and, more particularly. to a coupling including an electrically operable water valve for introducing water into the machine at predetermined times in a machine cycle. The coupling is connected to the machine by a multipassageway low pressure conduit.

Prior to the present invention, the water valve for introducing water into the machine had been located within the machine cabinet and water under line pressure was delivered to the valve through a conduit connecting the coupling to the valve, the result being that the hoses connecting the valve and machine to the water source were necessarily designed to withstand full line pressure. Examples of prior art coupling devices are disclosed in U.S. Pat. No. 3,306,319 to N. L. Kendt el al. and U.S. Pat. No. 3,635,243 to B. J. Brezosky assigned to General Electric Company, the assignee of the present invention. It will be noted that in these devices the user of the machine turns on the faucet to deliver water to the valve located in the machine wherein the water is then introduced to the machine tub by automatically operating the valve at appropriate times in the cycle. As pointed out herein above, in the prior art coupling sytems the hose is constantly under full line pressure until such time as the valve in the machine is energized during the relatively short fill operation and, the hoses were by necessity constructed to withstand line pressure for extended periods of time.

Attempts have also been made in prior devices to use multipassageway conduits such as are shown in U.S. Pat. No. 2,012,834 to C. M. Snider et al. and U.S. Pat. No. 2,422,060 to G. H. Wotring assigned to the General Electric Company, assignee of the present invention. While these hoses may have had the advantage of a single unitary body, they were used with machines incorporating the water valve within their cabinet; and in fact were designed to withstand line pressure which, in effect, made them somewhat bulky to handle and expensive to manufacture.

SUMMARY OF THE INVENTION

This invention relates generally to a coupling assembly that permits a washing machine to be connected to a source of water at line pressure such as a kitchen faucet. More specifically, the invention is an improved construction for a coupling assembly unit that includes a body portion defining a liquid passageway therethrough and having an inlet end with means to removably couple it to a water faucet spout, and at least two separate outlets therefrom. One of the outlets communicates with a water delivery passageway formed in a multipassageway conduit for selectively delivering water to a washing machine such as a dishwasher, and the other outlet serves for dispensing water from the assembly in the direction of the sink normally located therebelow. The dispensing outlet may be provided with a manually operative valve movable to permit water to flow outwardly through the dispensing outlet. Located between the inlet and the outlet leading to the delivery passageway is an electrically controlled valve wired to the machine sequence control system for selectively energizing the valve at predetermined times in the machine cycle of operation. The assembly preferably has a drain passageway therethrough which receives effluent from the washing machine through another passageway in the connecting conduit.

The preferred embodiment of the present invention provides a device which maintains the line pressure at or within the coupling assembly by controlling the flow of water to the machine within the housing. The conduit connecting the coupling to the machine is not subjected to line pressure, but receives flowing water only when, through the machine sequence control, the electrically operated valve is energized during the relatively short fill operation of the machine. Isolation of the high line pressure from the conduit at the coupling enables the conduit connecting the coupling to the washing machine to be constructed as a low pressure conduit, that is, a conduit designed to transmit water under relatively low flow pressure conditions. The conduit of the present invention also includes a passageway through which the necessary wires connecting the valve to the sequence control mechanism are passed through.

The present invention provides a coupling sytem wherein the water inlet valve for introducing water into the machine is encapsulated in the housing that is removably attached to the water faucet. The water directed to the machine, the effluent discharged from the machine, and the necessary wires for operating the valve are carried in separate passageways in a common conduit.

DESCRIPTION OF THE PREFERRED EMBODIMENT

Figure 1:
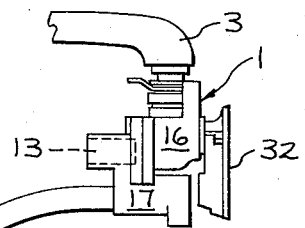
FIG. 1 is a view showing the coupling system of the present invention connecting a faucet assembly to a washing machine.

Referring to the drawings wherein one embodiment of the present invention is shown and more particularly to FIG. 1, there is illustrated a coupling assembly 1 for connecting a washing machine 2 to the outlet end of a faucet 3 through a multipassageway conduit 4. At the machine terminal of the conduit 4 there is provided a distribution member through which, as will hereinafter be described, one of the passageways in the conduit 4 communicates with a fill hose 7 for introducing water into the tub 8 and another of the passageways in the conduit 4 communicates with a drain hose 9 leading from a pump 11. Also carried in the conduit 4 are electrical conductors 12 which connect a solenoid operated valve means 13 located in the coupling 1 to a sequence control 14 of conventional construction for operation at predetermined times in a machine cycle of operation.

Figure 2:
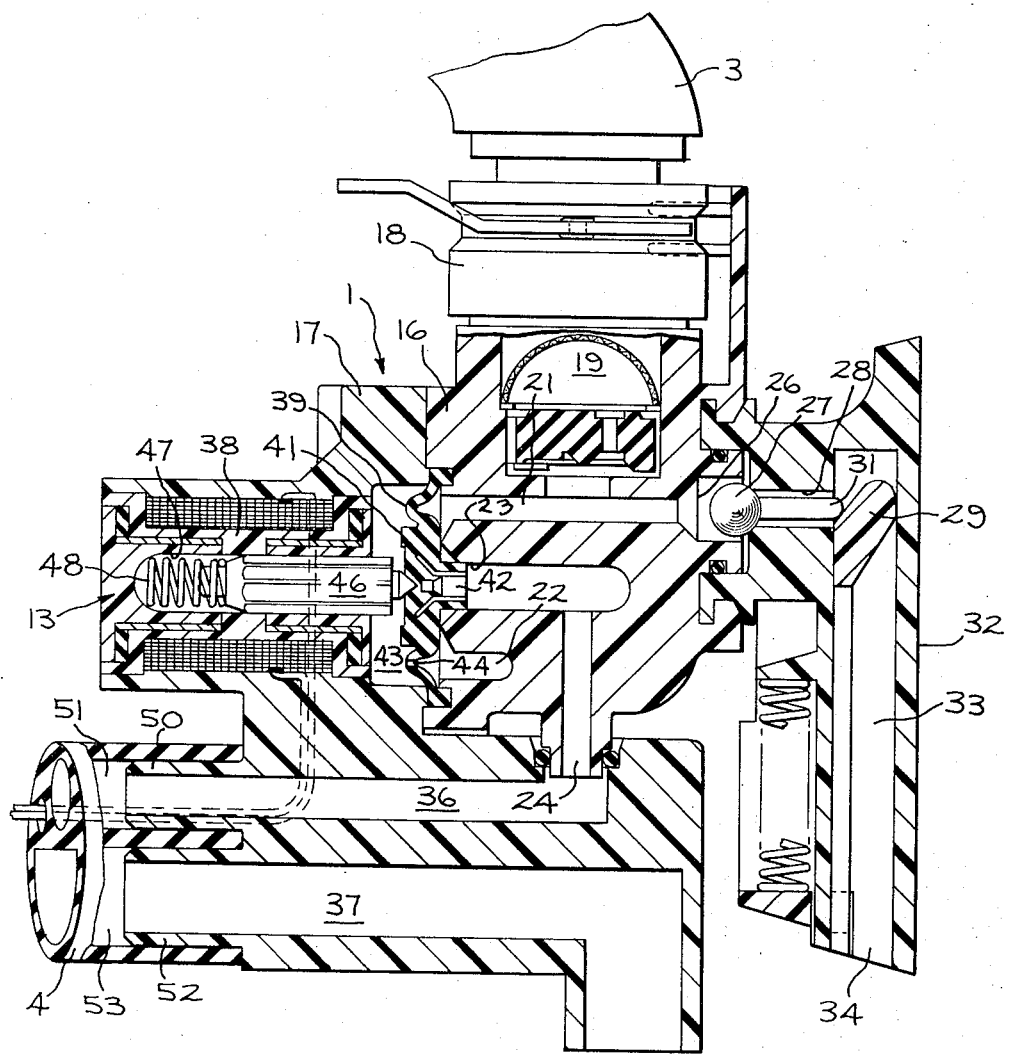
FIG. 2 is an enlarged sectional view of the improved coupling assembly.

Referring now to FIG. 2 the coupling assembly comprises two body portions 16 and 17 which are suitably joined together to form a unitary coupling. The body portion 16 is provided with connecting means 18 for removably coupling it to the faucet 3 whereby the inlet end 19 is in liquid receiving relationship with the faucet 3. The inlet end 19 communicates with a water chamber 21 having an annular passage 22 formed about a cylindrical outlet port 23 communicating with an outlet 24. The other end of chamber 21 is provided with an area 26 having an elastometric valve member 27 located therein for sealing chamber 21 from an outlet 28. It will be noted that the valve member 27 is fitted loosely and is normally held in the closed position as shown in FIG. 2 by water pressure within the chamber 21 exerted against the member 27. The valve member 27 in the present embodiment is arranged to be unseated by a camming action of manually operated member 29 acting against a stem 31 formed on the valve member 27. It will be understood that the user desiring water need simply slide the member 29 located within a housing 32 upwardly so that the cam member 29 moves against the valve stem 31 thereby moving the valve member 27 so that water within the chamber 21 will flow past the valve 27 and outlet 28 downwardly through a channel 33 and out from a dispensing port 34. Located in the body portion 17 on the assembly 1 is an outlet passageway 36 communicating with outlet 24 and an effluent discharge passageway 37.

Figure 3:
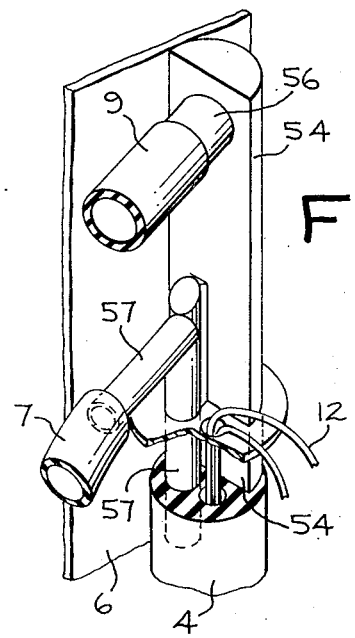
FIG. 3 is a fragmentary perspective view showing the connecting arrangement at the machine.
Figure 4:
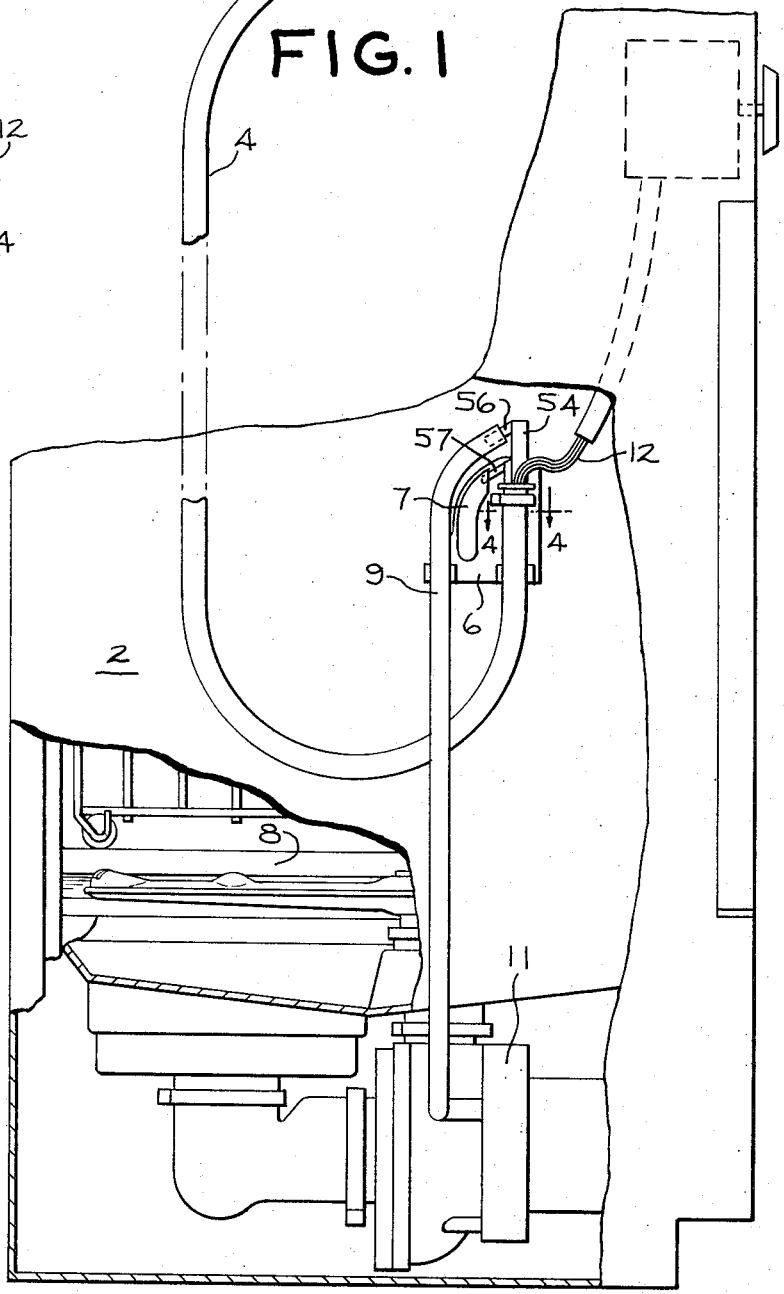
FIG. 4 is a sectional view taken along lines 4—4 of FIG. 1.
Figure 4:
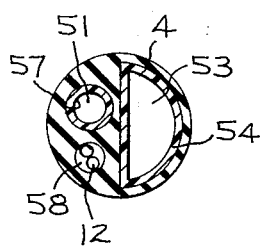

In accordance with one aspect of the present invention the valve means 13 for controlling the flow of water into the machine wash tube 18 is located in the coupling 1 and is operable through the sequence control 14 located in the machine 2. Located in the body portion 17 (FIG. 2) and encapsulated therein is a solenoid 38 which lines up with the outlet port 23 to control the operation of a diaphragm 39. The diaphragm is held at its radially disposed edges between the body portions 16 and 17 and is provided with a central thickened portion 41 which cooperates with the port 23 to control fluid flow therethrough. A center passage 42 in the diaphragm 34 serves to communicate fluid from a chamber 43 formed above the diaphragm to the outlet port 23. A bleed port 44 is also formed within the diaphragm so as to communicate fluid from the inlet passage 22 to the chamber 43. The port 44 has a smaller flow area than the central orifice 42 so that when each of the ports are opened fluid will flow from the chamber 43 to the outlet port 23 faster than it will flow from the chamber 43 from the inlet passage 22. Such fluid operated solenoid controlled diapghram valves are now widely accepted in the valve art and operate on the following principles. When the central port 42 is closed the fluid will flow from the inlet 22 to the chamber 43 thereby creating a differential fluid force on the opposite sides of the diaphragm 39 to maintin the diaphragm in the seated position with respect to the port 23. The dipahragm 39 can be unseated from the port 23 merely by opening communication between the chamber 43 and port 23 through the passage 42. Since the flow area of passage 42 is greater than the flow area of port 44, fluid will flow from the chamber 43 faster than it will flow into the chamber, and fluid pressure acting on the undersurface of the diaphragm 39 will act to force the diaphragm to an open position. The outlet port 23, it will be observed, communicates with the outlet 24 and passageway 36. Referring once again to FIG. 2 an armature 46 is adapted to control fluid flow through the central port 42 in the diaphragm 39, and is mounted for actually axial sliding movement within an armature guide 47. A return spring 48 is mounted within the upper end of the guide 47 having one end seated against the closed end of the guide and having its opposite end seated against the armature 46 so that the armature 46 will be biased into a position wherein it is seated upon the diaphragm 39 to shut off fluid flow through the central port 42. As best seen in FIG. 2 to connect the conduit 4 to the coupling 1 the body portion 17 at the outlet end of the passageay 36 is provided with a nipple 50 that is received in a passageway 51 formed in the conduit 4, while the inlet end of the effluent discharge passageway 37 is provided with a nipple 52 that is received in a passageway 53 also formed in conduit 4. Referring now to FIGS. 3 and 4 the distribution member 6 is provided with a portion 54 that is received in passageway 53 and, at its other end portion 54, is provided with a nipple 56 on which the drain hose 9 is secured. In use, effluent pumped from the machine through pump 11 is transferred through hose 9, portion 54, thence through passagewy 53 in conduit 4 and out through passageway 37 located in the coupling 1 which is located over a suitable drain or sink not shown. Formed integral with portion 54 on member 6 is a nipple 57 which is received at one end in the passageway 51 of conduit 4 and at its other end loosely into the fill hose 7 so as to provide an air gap. At the coupling end the electric wires 12 are encapsulated (not shown) into the body portion 17 so as to be electrically connected to the solenoid. The wires 12 as they emerge from the body portion 17 are inserted into a passageway 58 provided in the conduit 4 and emerge at member 6 where they then extend to be connected in the sequence control 14.

It will be understood that the energization of the valve means 13 is under the influence of the sequence control 14 and the flow of water as in prior art machines is automatically inserted into the machine tube 8 at predetermined times during the machine cycle of operation. However, in accordance with the present invention when the housewife connects the coupling 1 to the faucet 3 and then turns the faucet on the valve means 13 maintains the line pressure in the coupling 1 and more specifically on the upstream or chamber 21 side of the diaphragm 39 as long as the solenoid 38 remains de-energized. It will be understood from the foregoing description that with this arrangement water is allowed to flow through the conduit 4 from the coupling 1 to the washing machine tub 8 only during the fill operation when the solenoid valve means 13 is energized. The flow of water through the passageway 51 in the conduit 4 will therefore always be at the relatively low flow pressure. The advantages of this feature are obvious in that the conduit 4 leading to the machine is not exposed to water at line pressure and may therefore be fabricated of relatively thin wall material which allows it to be flexible and lightweight.

It should be apparent to those skilled in the art that what has been heretofore described is considered to be the presently preferred ebodiments of this invention and that changes may be made in the disclosed apparatus without actually departing from the true spirit and scope of this invention.

I claim:

1. A coupling assembly connecting an automatic washing machine having an automatic sequence control means to a line pressure water supply faucet for introducing water to said machine at predetermined times in a cycle of operation of said machine comprising:

a body portion defining a water passageway therein having an inlet end removably connected to the faucet and an outlet passageway for transmitting water from said passageway toward said machine and a discharge passageway for receiving fluid from said washing machine;

an electrically operable water inlet valve disposed in said passageway for allowing the introduction of water into said machine at predetermined times in a cycle of operation of said automatic machine;

a multipassageway conduit connected at one end to said body portion including a first passageway connecting said outlet passageway with said washing machine for introducing water into said machine, a second passageway connecting said washing machine to said discharge passageway for receiving effluent from said machine, and a third passageway for receiving wires for electrically connecting said water valve to said automatic washing machine sequence control means for allowing the introduction of water into said machine at predetermined times in a cycle of operation of said automatic washing machine.

2. A coupling as set forth in claim 1 wherein a distribution member for receiving the other end of said multipassageway conduit including a first means for directing water from said water passageway into said machine, and a second means for directing effluent from said washing machine into said second passageway for discharge through said discharge passageway.

* * * * *

UNITED STATES PATENT OFFICE
CERTIFICATE OF CORRECTION

Patent No. 3,788,347　　　　　Dated January 29, 1974

Inventor(s) Lauren W. Guth

It is certified that error appears in the above-identified patent and that said Letters Patent are hereby corrected as shown below:

Claim 2, line 12, "water", second occurrence, should read -- first --.

Signed and sealed this 21st day of May 1974.

(SEAL)
Attest:

EDWARD M. FLETCHER, JR.　　　　　C. MARSHALL DANN
Attesting Officer　　　　　　　　　Commissioner of Patents